(12) United States Patent
Grengs

(10) Patent No.: US 8,272,493 B1
(45) Date of Patent: Sep. 25, 2012

(54) SWING AUGER DRIVE ATTACHMENT SYSTEM

(76) Inventor: Greg L. Grengs, Sherwood, ND (US)

( * ) Notice: Subject to any disclaimer, the term of this patent is extended or adjusted under 35 U.S.C. 154(b) by 237 days.

(21) Appl. No.: 12/789,458

(22) Filed: May 28, 2010

(51) Int. Cl.
*B65G 41/00* (2006.01)

(52) U.S. Cl. ........................................ 198/300; 198/315

(58) Field of Classification Search .................. 198/300, 198/301, 302, 312, 313, 315, 317
See application file for complete search history.

(56) References Cited

U.S. PATENT DOCUMENTS

| | | | |
|---|---|---|---|
| 3,154,189 A | 10/1964 | O'Hanlon et al. | |
| 3,338,636 A * | 8/1967 | Chapman et al. | 406/29 |
| 3,462,199 A * | 8/1969 | Downing et al. | 406/80 |
| 4,603,775 A | 8/1986 | Plett | |
| 4,963,066 A | 10/1990 | Boppart | |
| 5,305,866 A | 4/1994 | Stewart | |
| 5,515,961 A * | 5/1996 | Murphy et al. | 198/302 |
| 5,964,566 A | 10/1999 | Stewart | |
| 6,120,233 A | 9/2000 | Adam | |
| 7,063,497 B2 | 6/2006 | Mast | |
| 7,090,066 B2 | 8/2006 | Kirsch | |
| 7,191,889 B1 | 3/2007 | Heley | |
| 7,438,009 B2 * | 10/2008 | Grant | 112/283 |
| 7,488,149 B2 | 2/2009 | Waldner | |
| 7,708,131 B2 * | 5/2010 | Muth | 198/315 |
| 7,891,641 B1 * | 2/2011 | Miller | 254/346 |
| 7,946,416 B2 * | 5/2011 | Grose et al. | 198/671 |
| 8,118,151 B1 * | 2/2012 | Jesse | 198/315 |

OTHER PUBLICATIONS

Hopper Walker; http://hopperwalker.com; Rust Sales; Harwood, ND.

* cited by examiner

*Primary Examiner* — Gene Crawford
*Assistant Examiner* — Keith R Campbell
(74) *Attorney, Agent, or Firm* — Neustel Law Offices

(57) ABSTRACT

A swing auger drive attachment system for remotely moving a swing auger in a circular arc. The auxiliary drive attachment generally includes one or more mounting brackets each having a plurality of openings, the openings adapted to align with preexisting wheel mounting holes of a swing hopper to vertically adjustably attach the mounting bracket. The mounting bracket also being horizontally angularly offset so an attached wheel is aligned with a curved directional path of the swing hopper. Connected to the mounting bracket is a drive motor having a drive shaft and a wheel connected, the wheel having a coupler assembly to rotationally connect and disconnect the wheel from the drive shaft to provide motor-driven power to the wheel or allow free-rotation of the wheel. A control unit in communication with the drive motor may be connected to a remote controller or an onboard manual controller.

20 Claims, 9 Drawing Sheets

SWING AUGER DRIVE ATTACHMENT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a swing auger and more specifically it relates to a swing auger drive attachment system for efficiently remotely operating a swing auger and for moving the swing auger in a smooth circular arc.

2. Description of the Related Art

Any discussion of the related art throughout the specification should in no way be considered as an admission that such related art is widely known or forms part of common general knowledge in the field.

Generally, swing augers and hoppers must be manually pushed/pulled to a desired location which requires the operator to dismount from the tractor and attempt to move the swing auger and hopper which is generally substantially heavy and large in size. Powered swing augers and hoppers are used which utilized the hydraulic power from the tractor to drive the wheels of the swing auger and hopper. These swing augers and hoppers generally require the tractor to be in operation during movement of the swing auger and hopper which can be costly and burdensome.

Other types of swing augers and hoppers may be operated to move independently of manual labor; however these swing augers generally do not move in a smooth arcing manner due to a fixed and straight orientation of the drive wheels which tends to create a dragging or frictional force against the arcing movement of the swing auger and hopper. Because of the inherent problems with the related art, there is a need for a new and improved swing auger drive attachment system for efficiently remotely operating a swing auger and for moving the swing auger in a smooth circular arc.

BRIEF SUMMARY OF THE INVENTION

A system for efficiently remotely operating a swing auger and for moving the swing auger in a smooth circular arc. The invention generally relates to a swing auger which includes one or more mounting brackets each having a plurality of openings, said openings adapted to align with preexisting wheel mounting holes of a swing hopper to vertically adjustably attach the mounting bracket. The mounting bracket also being horizontally angularly offset with the swing hopper so an attached wheel is aligned with a curved directional path of the swing hopper. Connected to the mounting bracket is a drive motor having a drive shaft and a wheel connected, said wheel having a coupler assembly to rotationally connect and disconnect said wheel from said drive shaft to provide motor-driven power to said wheel or allow free-rotation of said wheel. A control unit in communication with said drive motor may be connected to a remote controller or an onboard manual controller.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
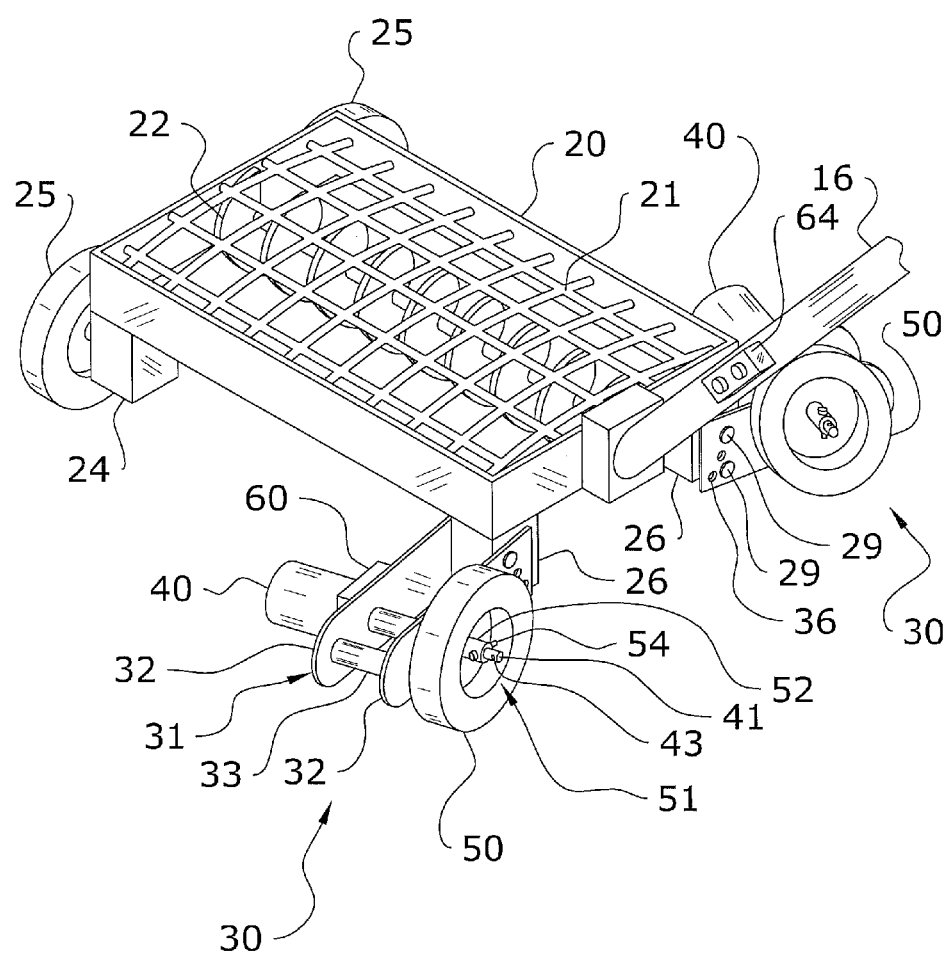
FIG. 1 is an upper perspective view of the present invention.

A. Overview.

Turning now descriptively to the drawings, in which similar reference characters denote similar elements throughout the several views, FIGS. 1 through 9 illustrate a swing auger drive attachment system 10, which comprises one or more mounting brackets 31 each having a plurality of openings 35, 36, said openings 35, 36 adapted to align with preexisting wheel mounting holes 27 of a swing hopper 20 to vertically adjustably attach the mounting bracket 31. The mounting brackets 31 also being horizontally angular offset so an attached wheel 50 is aligned with a curved directional path of the swing hopper 20. Connected to the mounting bracket 31 is a drive motor 40 having a drive shaft 41 and a wheel 50 connected, said wheel 50 having a coupler assembly 51 to rotationally connect and disconnect said wheel 50 from said drive shaft 41 to provide motor-driven power to said wheel 50 or allow free-rotation of said wheel 50. A control unit 60 in communication with said drive motor 40 may be connected to a remote controller 62 or an onboard manual controller 64.

B. Main Auger.

Figure 7:
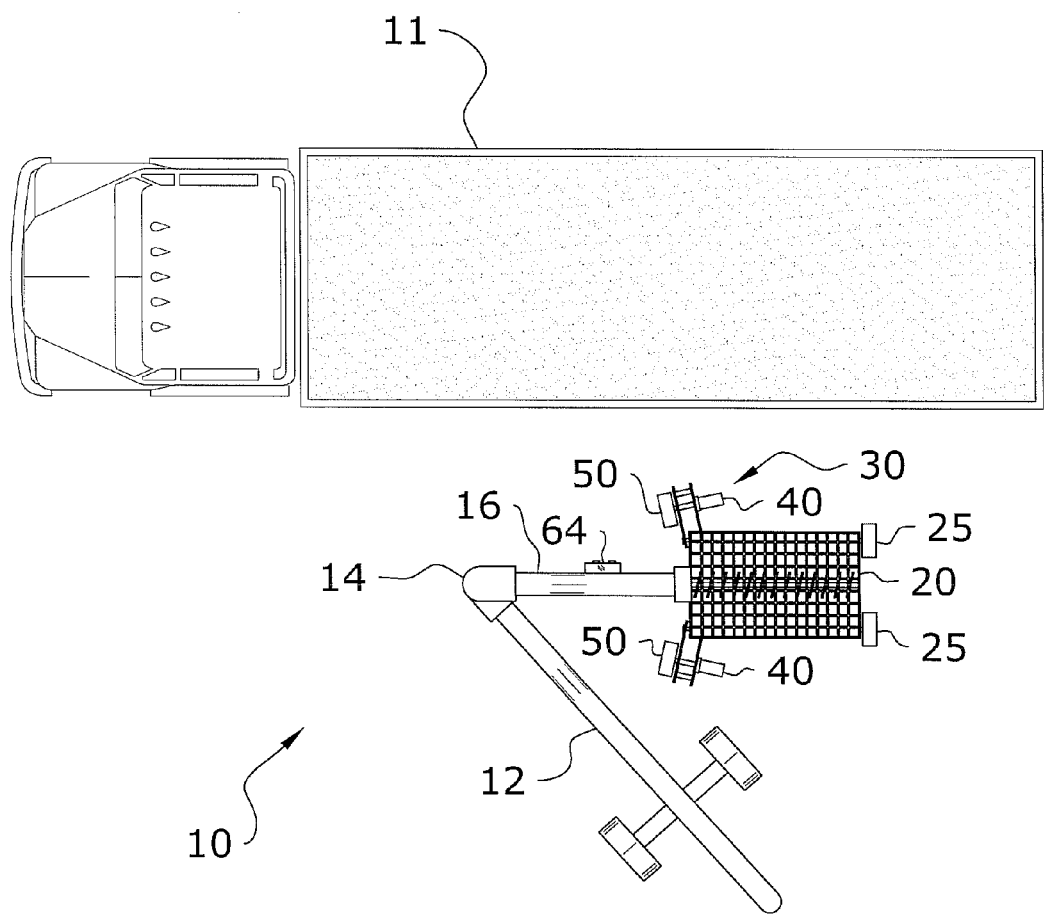
FIG. 7 is a top view of the present invention in use.
Figure 8:
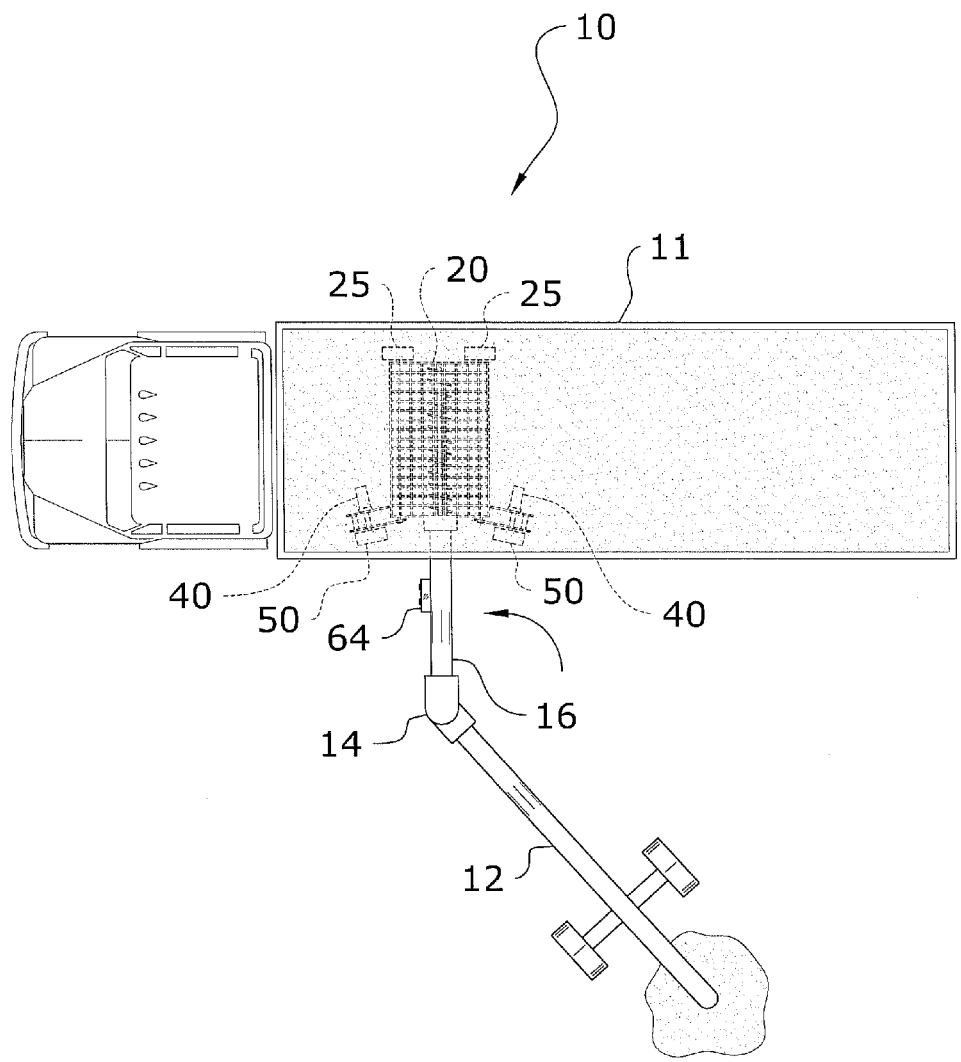
FIG. 8 is a top view of the present invention in use and illustrating the hopper being smoothly swung under a trailer via the angular offset wheels following a curved directional path of the swing hopper.
Figure 9:
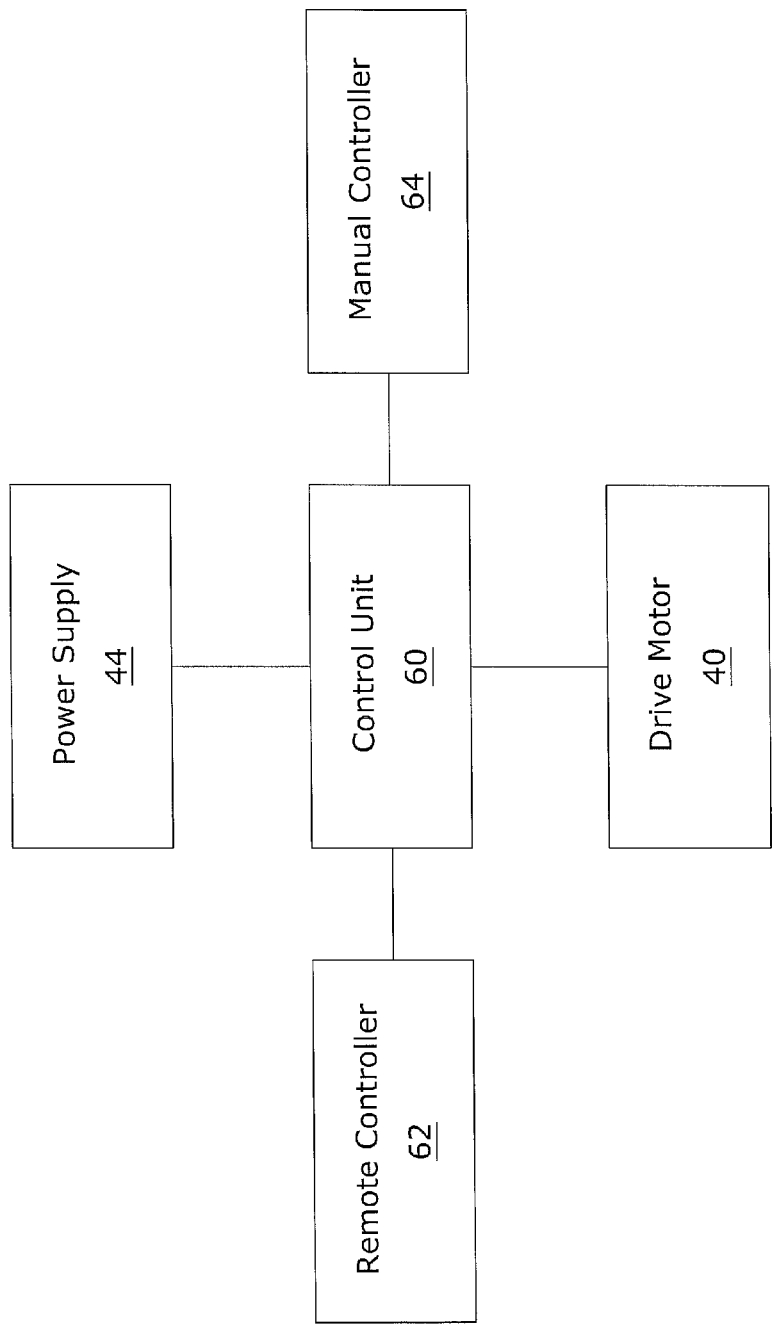
FIG. 9 is a block diagram view of the control unit and connected components.

The main auger 12 is illustrated in FIGS. 7 and 8 and it is appreciated that various well known auger structures may be used with the present invention, all which efficiently transport particular material, such as grain. The main auger 12 illustrated in FIGS. 7 and 8 is illustrative and should not limit the structure of the main auger 12 used with the present invention.

C. Swing Auger.

The present invention includes a swing auger 16 rotatably connected to the main auger 12 in a pivotal manner, generally via one or more pivotal connectors 14, such as a chute, etc. It is appreciated that various well known auger structures may be used with the present invention, all which efficiently transport particular material, such as grain. The swing auger 16 is illustrative and should not limit the structure of swing main auger 12 used with the present invention.

D. Swing Hopper.

The swing hopper 20 is connected to the swing auger 16 to swing or pivot along with the swing auger 16 about the main auger 12 as illustrated in FIGS. 7 and 8. The swing hopper 20 may be comprised of any conventional hopper structure capable of collecting the particulate material from beneath a hopper trailer 11, vehicle, and the like. The present invention may be retrofitted to an existing swing hopper 20 or may be incorporated with a new swing hopper 20 as appreciated.

The swing hopper 20 generally includes a screen 21 positioned over a rotating feed auger 22 as well known in the art of swing augers 16. The swing hopper 20 also generally includes outer wheel supports 24 for supporting conventional outer wheels 25 and inner wheel supports 26 for supporting conventional inner wheels (not shown). The outer wheel supports 24 are generally located at an outer end of the swing hopper 20 opposite the swing auger 16 and the inner wheel supports 26 are generally located at an inner end of the swing hopper 20 adjacent the swing auger 16. Generally, the hopper includes two inner wheel supports 26 and two outer wheel supports 24 to support four wheels for moving the swing auger 16 about a ground surface.

Figure 2:
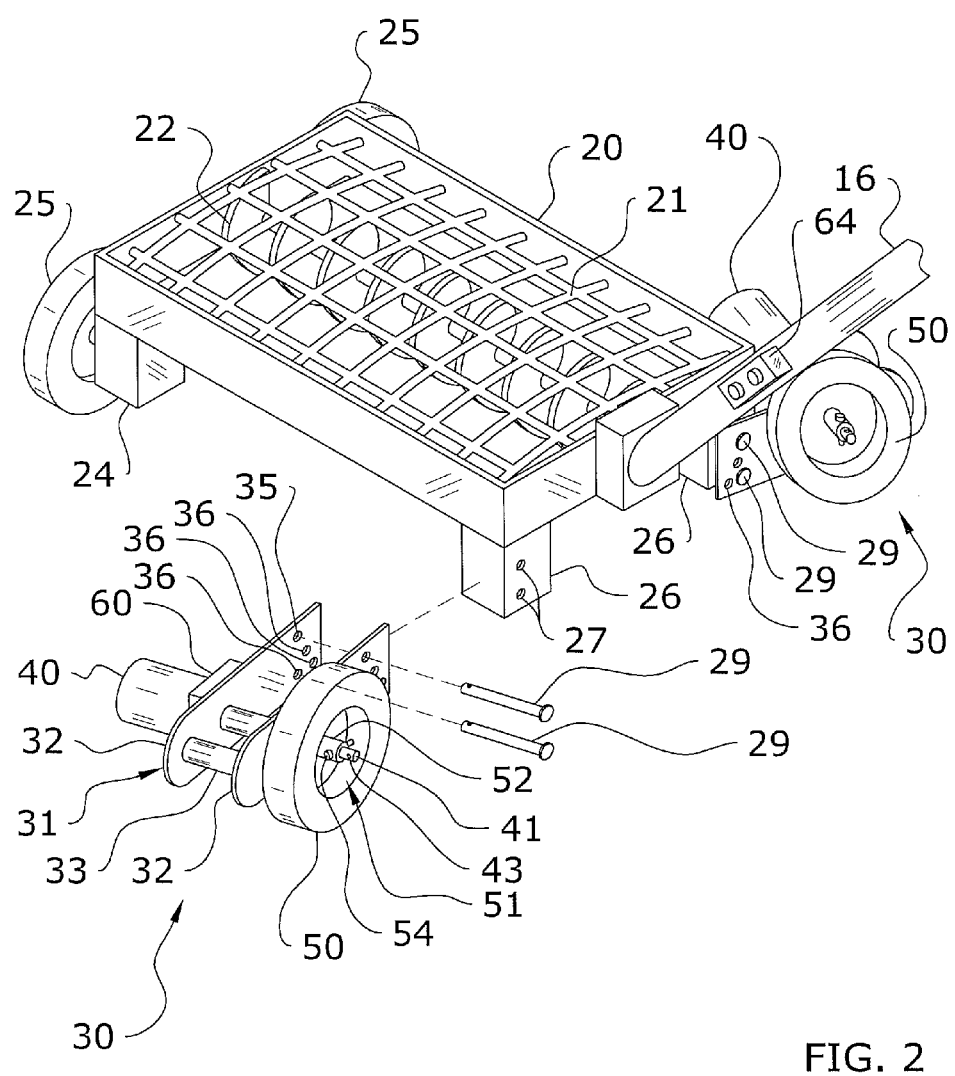
FIG. 2 is an upper perspective view of the present invention with one of the drive attachment units exploded therefrom.
Figure 3:
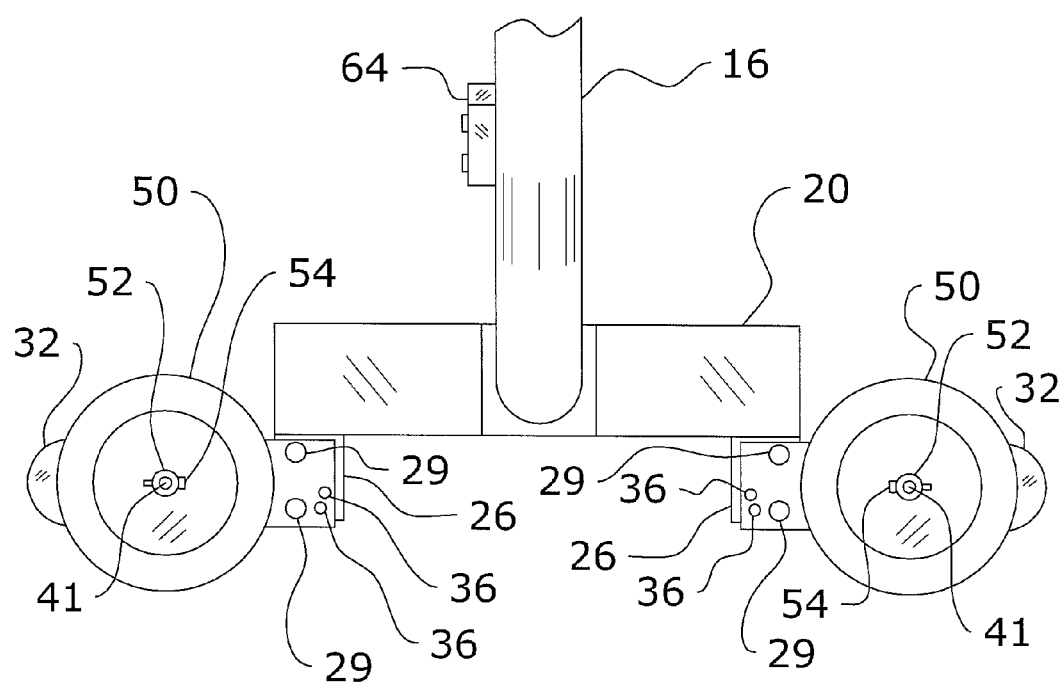
FIG. 3 is a front view of the present invention with the wheels in a first vertical position.

The present invention generally attaches to the preexisting mounting holes 27 of the inner wheel supports 26 via fasteners 29 as illustrated in FIG. 2. Thus, the conventional inner wheels are preferably removed and the mounting brackets 31, are attached where each of the two inner wheels were formerly located. Each of the mounting brackets 31 preferably independently attaches to each inner wheel support 26 so that one or more mounting brackets 31 may be attached as necessary or desired.

E. Drive Attachment Units.

The present invention preferably includes a pair of drive attachment units 30 each attaching to a corner of an inner end of the swing hopper 20 in place of the conventional inner wheels. The drive attachment units 30 each include a mounting bracket 31 which attaches to the inner wheel support 26, a drive motor 40 supported by the mounting bracket 31, and an inner wheel 50 selectively coupled to the drive motor 40. Each drive attachment unit 30 may also include a control unit 60 in communication with the drive motor 40 for controlling an operation of the drive motor 40.

Each drive attachment unit 30 preferably attaches and operates independently of the other. It is appreciated that the drive attachment unit 30 may alternately be connected to the outer wheel supports 24 of the swing hopper 20 in an alternate embodiment of the present invention.

The mounting brackets 31 are generally comprised of elongated structures and attach to the inner wheel supports 26 in an angular offset manner, thus being aligned with a curved arc following the path of the swing auger 16. The mounting brackets 31 are thus traverse to the front end of the swing hopper 20. The mounting brackets 31 may be fixed in the angular offset position in various manners, one of which being the end support 33 of the mounting brackets 31 being comprised of a greater length than the inner wheel supports 26 and the fasteners 29 used to attach the mounting brackets 31 affixed in a manner to angular offset the mounting bracket 31.

Figure 4:
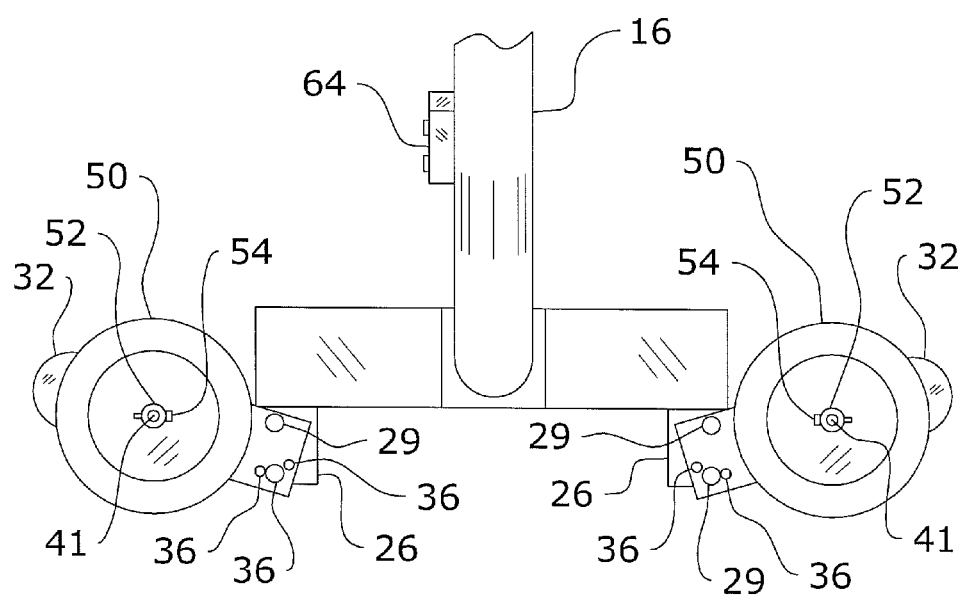
FIG. 4 is a front view of the present invention with the wheels in a second vertical position.

Each mounting bracket 31 generally includes a pair of spaced apart and parallel elongated plates 32 to be positioned adjacent an inner and outer end of the inner wheel supports 26. The plates 32 are secured on a distal end via the end support 33. Each of the plates 32 generally includes an upper opening 35 and a plurality of lower adjustment openings 36 angular offset from one another for receiving the fasteners 29 and being aligned with the mounting holes 27 to raise or lower the distal end of the mounting brackets 31 and thus raise or lower the wheels as illustrated in FIG. 4. It is appreciated that more or less lower adjustment openings 36 rather than what is illustrated may be used with the mounting brackets 31 to further vertically adjust the height of the wheels as needed.

Each drive attachment unit 30 also generally includes a drive motor 40 which may be comprised of an electric, hydraulic, or other type of motor 40. The power supply 46 for the motor 40 may be onboard each drive attachment unit 30 or may be a combined power supply 46, such as by using the tractor or vehicle power supply 46. Each drive motor 40 is connected to the mounting bracket 31 and includes a drive shaft 41 which extends through the plates 32 to connect to the wheel on the inner side of the mounting bracket 31 and near the distal end of the mounting bracket 31.

It is appreciated that by positioning both motors 40 on an inner end of the swing hopper 20, the speed of the motors 40 may be similar to achieve a smooth rotation of the wheels over the ground surface. When positioning wheels on the outer end and the inner end of the swing hopper 20, the wheels must be rotated at different speeds to accommodate for the different diameters of each wheels associated curved path to prevent the outer wheel 25 or the inner wheel 50 from dragging or slipping.

Each drive attachment unit 30 includes a wheel 50 that is preferably parallel to the plates 32 of the mounting bracket 31 thus being angularly offset to the swing hopper 20 to follow a curved directional path of the swing hopper 20. Thus, the wheels 50 smoothly follow the curved directional path to ease stresses upon the drive shaft 41 and the drive motor 40. The wheel 50 may be rotationally coupled to the drive shaft 41 to rotate with the drive shaft 41 and be rotationally-driven by the drive motor 40 or the wheel may be uncoupled from the drive shaft 41 to freely spin 54 about the drive shaft 41 and thus allow for a manual movement of the swing hopper 20, such as during electrical or mechanical failure of the drive motor 40 or other component of the drive attachment unit 30. Each wheel 50 generally has a plurality of lugs (not shown) to ensure proper traction of the wheel 50 within the ground surface.

Figure 5:
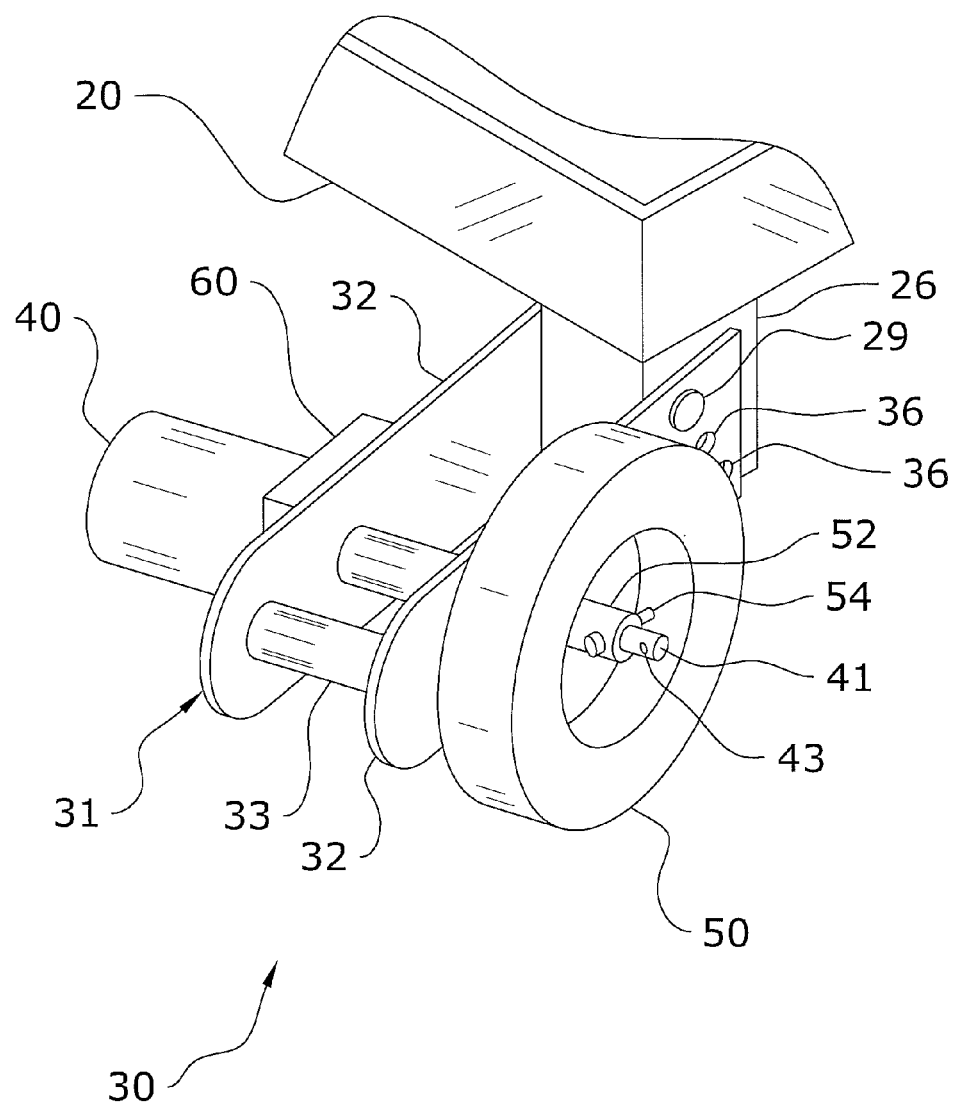
FIG. 5 is an upper perspective view of the drive attachment unit with the wheel rotationally coupled to the drive shaft.

Each wheel 50 is rotationally coupled and uncoupled to the drive shaft 41 via a coupler assembly 51, wherein the wheel 50 includes a collar 52 opposite the mounting bracket 31 thus being easily accessible. The collar 52 has an opening 53 extending therethrough to align with a first opening 42 extending through the drive shaft 41. A pin 54 may be collectively extended through the opening 53 in the collar 52 and the first opening 42 in the drive shaft 41 to rotationally couple the wheel 50 to the drive shaft 41 and thus drive motor 40 and also to retain the wheel 50 upon the drive shaft 41 as illustrated in FIG. 5.

Figure 6:
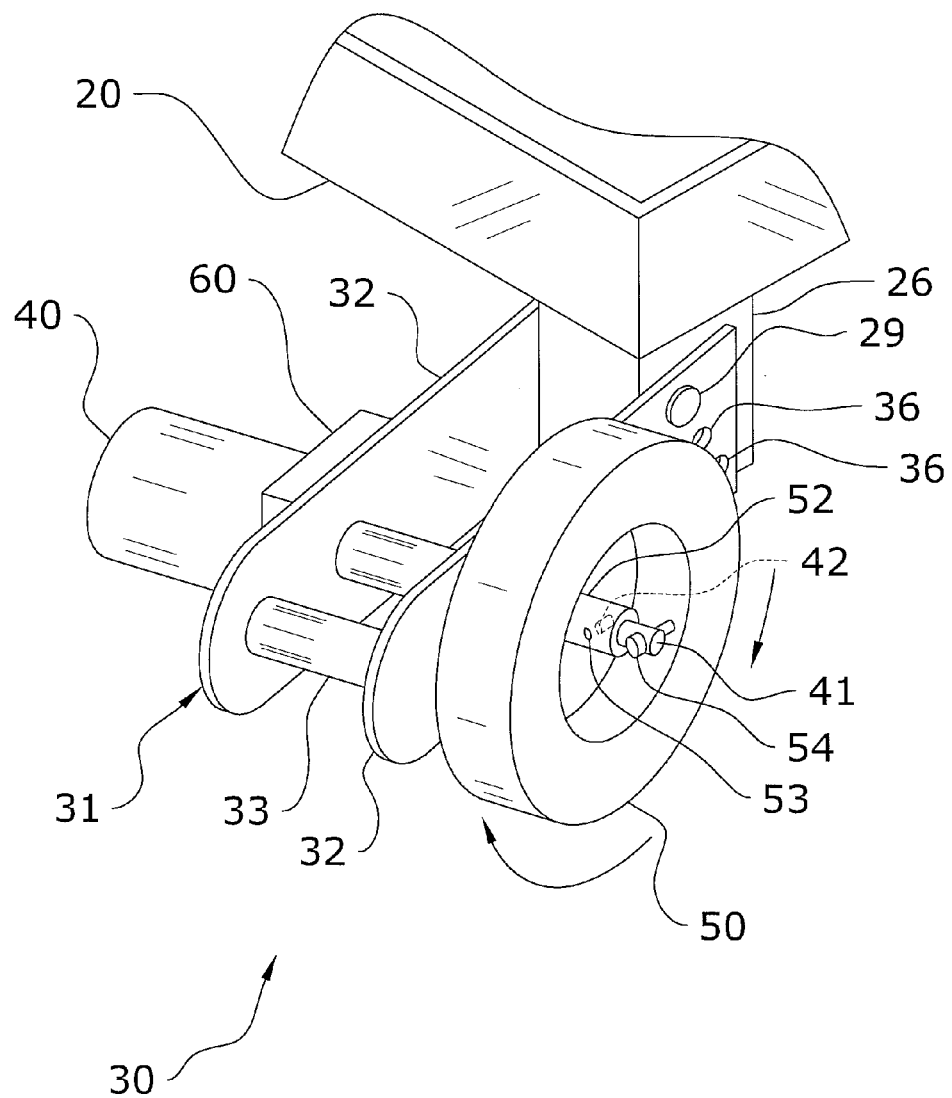
FIG. 6 is an upper perspective view of the drive attachment unit with the wheel rotationally uncoupled to the drive shaft.

The drive shaft 41 also includes a second opening 43 spaced outwardly from the collar 52. If the wheel 50 is desired to freely rotate about the drive shaft 41, the pin 54 may be removed from the collar 52 and extended through the second opening 43 of the drive shaft 41 spaced forwardly from the collar 52. In the free-rotational position of the wheel 50, the pin 54 retains the wheel 50 upon the shaft 41 by engaging a front end of the collar 52 and does not rotationally couple the pin 54 to the shaft 41 via not extending through the collar 52 as illustrated in FIG. 6.

Each drive attachment unit 30 also generally includes a control unit 60 in communication with the drive motor 40 to control the operation of the drive motor 40 and generally onboard the drive attachment unit 30. The control unit 60 may be operably controlled via a hand-held remote controller 62 from various distances away. The remote controller 62 may be programmed to simultaneously control one or more control units 60 and also one or more drive motors 40 from one or more swing hoppers 20. The control unit 60 may alternately be controlled via a manual controller 64 located upon the swing hopper 20, swing auger 16, tractor, etc. Various other devices may be controlled via the manual controller 64 or the remote controller 62, such as lights, a winch, time delay for activation of the motor 40, shut off feature, etc.

F. Operation of Preferred Embodiment.

In use, the conventional inner wheels of the swing hopper 20 are removed and a pair of drive attachment units 30 is connected to the swing hopper 20 utilizing the preexisting mounting holes 27 of the swing hopper 20. The horizontal angle and vertical height of the mounting brackets 31 are adjusted as desired.

If the wheels 50 are desired to be rotationally-driven through the motor 40, the pin 54 of the coupling assembly 51 is extended through the collar 52 and opening 42 of the drive shaft 41. If the wheels 50 are desired to be freely rotated, the pin 54 is solely extended through the opening 43 of the drive shaft 41 forward of the collar 52 thus allowing the wheels 50 to freely rotate about the drive shafts 41. Either the remote controller 62 or manual controller 64 may be used to operably control the drive motors 40.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A drive attachment unit for a swing hopper, said swing hopper being connected to a swing auger and said swing hopper having preexisting mounting holes for a rotational wheel, said drive attachment unit comprising:
   a mounting bracket having a plurality of openings therethrough, said openings adapted to align with preexisting mounting holes of a swing hopper for being connected thereto;
   a drive motor supported by said mounting bracket, said drive motor having a drive shaft extending therefrom which is operatively rotated by said drive motor;
   a wheel connected to said drive shaft, said wheel having a coupler assembly to rotationally couple and uncouple said wheel from said drive shaft to provide motor-driven power to said wheel via being coupled to said drive shaft or allow free-rotation of said wheel about said drive shaft via being uncoupled from said drive shaft, said coupler assembly being comprised of a coupler rotationally coupled to said wheel, wherein said drive shaft extends through said coupler and wherein said coupler has an opening extending through; and
   a control unit in communication with said drive motor, said control unit adapted to control an operation of said drive motor.

2. The drive attachment unit of claim 1, including a pair of drive attachment units, each said drive attachment unit separately mounted to a swing hopper.

3. The drive attachment unit of claim 2, wherein said pair of drive attachment units operate independently of each other.

4. The drive attachment unit of claim 1, wherein said wheel is angularly offset with respect to a connected swing hopper.

5. The drive attachment unit of claim 4, wherein a longitudinal axis of said mounting bracket is angularly offset with respect to a connected swing hopper.

6. The drive attachment unit of claim 1, wherein said plurality of openings include an upper opening and a plurality of lower adjustment openings for adjusting a height of said wheel.

7. The drive attachment unit of claim 1,
   wherein said drive shaft includes a first opening aligned with said opening of said coupler and a second opening positioned forwardly of said first opening and said coupler; and
   a pin secured to said drive shaft for retaining said wheel upon said drive shaft, wherein said pin extends through said opening of said coupler and said first opening of said drive shaft to rotationally couple said wheel to said drive shaft and wherein said pin extends through said second opening of said drive shaft and is positioned forwardly of said coupler to rotationally uncouple said wheel from said drive shaft.

8. The drive attachment unit of claim 1, including a remote controller connected to said control unit for operating said control unit.

9. The drive attachment unit of claim 1, including a manual controller connected to said control unit for operating said control unit.

10. A swing auger drive attachment system, comprising:
   a swing auger connected to a main auger;
   a swing hopper connected to said swing auger, said swing hopper having an inner end and an outer end, said inner end adjacent said swing auger and said outer end opposite said swing auger;
   a plurality of outer wheels rotatable along said outer end of said swing hopper, said plurality of outer wheels connected to said outer end of said swing hopper;
   a plurality of inner wheels rotatable along said inner end of said swing hopper, said plurality of inner wheels connected to said inner end of said swing hopper;
   at least one drive motor mechanically connected to at least one of said plurality of inner wheels to drive said inner wheel, said at least one drive motor having a drive shaft rotatably coupled to said inner wheel;
   said inner wheel having a coupler assembly to rotationally couple said inner wheel to said drive shaft, said coupler assembly being adjustable to uncouple said inner wheel from said drive shaft for said inner wheel to spin freely about said drive shaft and independent of said drive motor, said coupler assembly being comprised of a coupler rotationally coupled to said wheel, wherein said drive shaft extends through said coupler and wherein said coupler has an opening extending through; and a control unit in communication with said at least one drive motor, said control unit adapted to control said drive motor.

11. The drive attachment unit of claim 10, wherein said at least one drive unit includes a pair of drive units, each said drive unit mechanically connected to a different said inner wheel and each said drive unit independently operated.

12. The drive attachment unit of claim 10, wherein said drive shaft includes a first opening aligned with said opening of said coupler and a second opening positioned forwardly of said first opening and said coupler; and a pin secured to said drive shaft for retaining said wheel upon said drive shaft, wherein said pin extends through said opening of said coupler and said first opening of said drive shaft to rotationally couple said wheel to said drive shaft and wherein said pin extends through said second opening of said drive shaft and is positioned forwardly of said coupler to rotationally uncouple said wheel from said drive shaft.

13. The drive attachment unit of claim 10, including a remote controller connected to said control unit for operating said control unit.

14. The drive attachment unit of claim 10, including a manual controller connected to said control unit for operating said control unit.

15. A swing auger drive attachment system, comprising:

a swing auger connected to a main auger;

a swing hopper connected to said swing auger, said swing hopper having an inner end and an outer end, said inner end adjacent said swing auger and said outer end opposite said swing auger;

said swing hopper having a pair of inner wheel supports, each of said inner supports having a plurality of mounting holes;

a pair of outer wheels rotatably along said outer end of said swing hopper, said pair of outer wheels connected to said outer end of said swing hopper;

a pair of mounting brackets having a plurality of openings, said plurality of openings align with said plurality of mounting holes to secure said pair of mounting brackets to said pair of inner supports via a plurality of fasteners;

a pair of inner wheels each secured to a mounting bracket of said pair of mounting brackets and rotatable along said inner end of said swing hopper;

each of said inner wheels angular offset with respect to said swing hopper, said inner wheels angular offset to be aligned with and follow a curved directional path of said swing hopper;

a pair of drive motors each mechanically and independently connected to a respective said inner wheel of each said mounting bracket, said pair of drive motors each having a drive shaft rotatably coupled to said inner wheel;

each said inner wheel having a coupler assembly to rotationally couple said inner wheel to said respective drive shaft, said coupler assembly being adjustable to uncouple said inner wheel from said drive shaft for said inner wheel to spin freely about said drive shaft and independent of said respective drive motor, said coupler assembly being comprised of a coupler rotationally coupled to said wheel, wherein said drive shaft extends through said coupler and wherein said coupler has an opening extending through; and at least one control unit in communication with said pair of drive motors, said control unit adapted to control said pair of drive motors.

16. The drive attachment unit of claim 15, wherein a longitudinal axis of said mounting bracket is angularly offset with respect to a connected swing hopper.

17. The drive attachment unit of claim 15, wherein said plurality of openings include an upper opening and a plurality of lower adjustment openings for adjusting a height of said wheel with respect to said swing hopper.

18. The drive attachment unit of claim 15, wherein said drive shaft includes a first opening aligned with said opening of said coupler and a second opening positioned forwardly of said first opening and said coupler; and a pin secured to said drive shaft for retaining said wheel upon said drive shaft, wherein said pin extends through said opening of said coupler and said first opening of said drive shaft to rotationally couple said wheel to said drive shaft and wherein said pin extends through said second opening of said drive shaft and is positioned forwardly of said coupler to rotationally uncouple said wheel from said drive shaft.

19. The drive attachment unit of claim 15, including a remote controller connected to said control unit for operating said at least one control unit.

20. The drive attachment unit of claim 15, including a manual controller connected to said control unit for operating said at least one control unit.

\* \* \* \* \*